(12) United States Patent
Blair et al.

(10) Patent No.: US 8,764,554 B2
(45) Date of Patent: Jul. 1, 2014

(54) CUSTOMIZED ENHANCEMENT SYSTEM

(75) Inventors: Thomas Blair, Austin, TX (US); Mark Halash, Austin, TX (US)

(73) Assignee: Sony Online Entertainment LLC, San Diego, CA (US)

( * ) Notice: Subject to any disclaimer, the term of this patent is extended or adjusted under 35 U.S.C. 154(b) by 759 days.

(21) Appl. No.: 12/623,288

(22) Filed: Nov. 20, 2009

(65) Prior Publication Data

US 2010/0210349 A1 Aug. 19, 2010

Related U.S. Application Data

(60) Provisional application No. 61/152,590, filed on Feb. 13, 2009.

(51) Int. Cl.
*A63F 9/00* (2006.01)

(52) U.S. Cl.
USPC .......................................................... 463/23

(58) Field of Classification Search
USPC .......................................................... 463/23
See application file for complete search history.

(56) References Cited

U.S. PATENT DOCUMENTS

| | | | | |
|---|---|---|---|---|
| 4,858,930 A | * | 8/1989 | Sato | 463/23 |
| 6,406,372 B1 | * | 6/2002 | Turmell et al. | 463/43 |
| 6,758,746 B1 | | 7/2004 | Hunter et al. | |
| 2002/0082077 A1 | * | 6/2002 | Johnson et al. | 463/30 |
| 2004/0266505 A1 | * | 12/2004 | Keam et al. | 463/1 |
| 2005/0059483 A1 | * | 3/2005 | Borge | 463/29 |
| 2005/0282624 A1 | * | 12/2005 | Kane | 463/25 |
| 2006/0135260 A1 | * | 6/2006 | Boss et al. | 463/42 |
| 2007/0032282 A1 | | 2/2007 | Hamamoto | |
| 2007/0087822 A1 | * | 4/2007 | Van Luchene | 463/25 |
| 2007/0111770 A1 | * | 5/2007 | Van Luchene | 463/7 |
| 2007/0129148 A1 | | 6/2007 | Van Luchene | |
| 2007/0265091 A1 | * | 11/2007 | Aguilar | 463/42 |
| 2008/0039169 A1 | | 2/2008 | Harris et al. | |
| 2008/0090628 A1 | * | 4/2008 | Mueller et al. | 463/1 |
| 2008/0214288 A1 | * | 9/2008 | Toneguzzo | 463/25 |
| 2009/0149248 A1 | * | 6/2009 | Busey et al. | 463/29 |
| 2009/0181774 A1 | * | 7/2009 | Ratcliff | 463/42 |
| 2010/0227669 A1 | * | 9/2010 | Van Luchene | 463/23 |

* cited by examiner

*Primary Examiner* — Seng H Lim

(74) *Attorney, Agent, or Firm* — Procopio, Cory, Hargreaves & Savitch, LLP

(57) ABSTRACT

A computer-implemented method of creating enhancements in a computer game for a recipient experiencing a performance, the method including: selecting an enhancement to apply to a recipient; modifying the enhancement; and applying the modified enhancement to the recipient, wherein the modified enhancement is effective for a fixed duration of time proportional to the time spent by the recipient experiencing the performance. Keywords include MMO, buffs, packages and performance.

22 Claims, 4 Drawing Sheets

CUSTOMIZED ENHANCEMENT SYSTEM

CROSS-REFERENCE TO RELATED APPLICATIONS

This application claims the benefit of priority of U.S. Provisional Patent Application No. 61/152,590, filed Feb. 13, 2009, entitled "Customized Enhancement System." The disclosure of the above-referenced provisional application is incorporated herein by reference.

BACKGROUND

A massively multiplayer online (MMO) role-playing game is an online computer game in which a large number of players interact with one another in a virtual world. As in most role-playing games, players assume the role of a fictional character (e.g., a Player Character) and take control over most of that character's actions. MMO games are distinguished from single-player or small multi-player games by the game's persistent world, usually hosted by a game provider, which continues to exist and evolve even when the player is away from the game.

One type of Player Character is an Entertainer or Performer Character. For example, an Entertainer Character in an MMO designs a performance to provide selected attribute bonuses or enhancements and then performs. Other characters that view or listen to the performance receive the selected bonuses for a period of time.

SUMMARY

Implementations of the present invention provide for designing and applying customized enhancements in a computer game.

In one implementation, a computer-implemented method of creating enhancements in a computer game for a recipient experiencing a performance, includes: selecting an enhancement to apply to a recipient; modifying the enhancement; and applying the modified enhancement to the recipient. The modified enhancement is preferably effective for a fixed duration of time proportional to the time spent by the recipient experiencing the performance.

In another implementation, a computer-readable storage medium storing a computer program for creating at least one custom enhancement for a recipient experiencing a performance, the program including executable instructions that cause a computer to: select at least one custom enhancement to apply to a recipient; and apply the at least one custom enhancement to the recipient. The at least one custom enhancement is preferably effective for a fixed duration of time proportional to the time spent by the recipient experiencing the performance.

DETAILED DESCRIPTION

Figure 1:
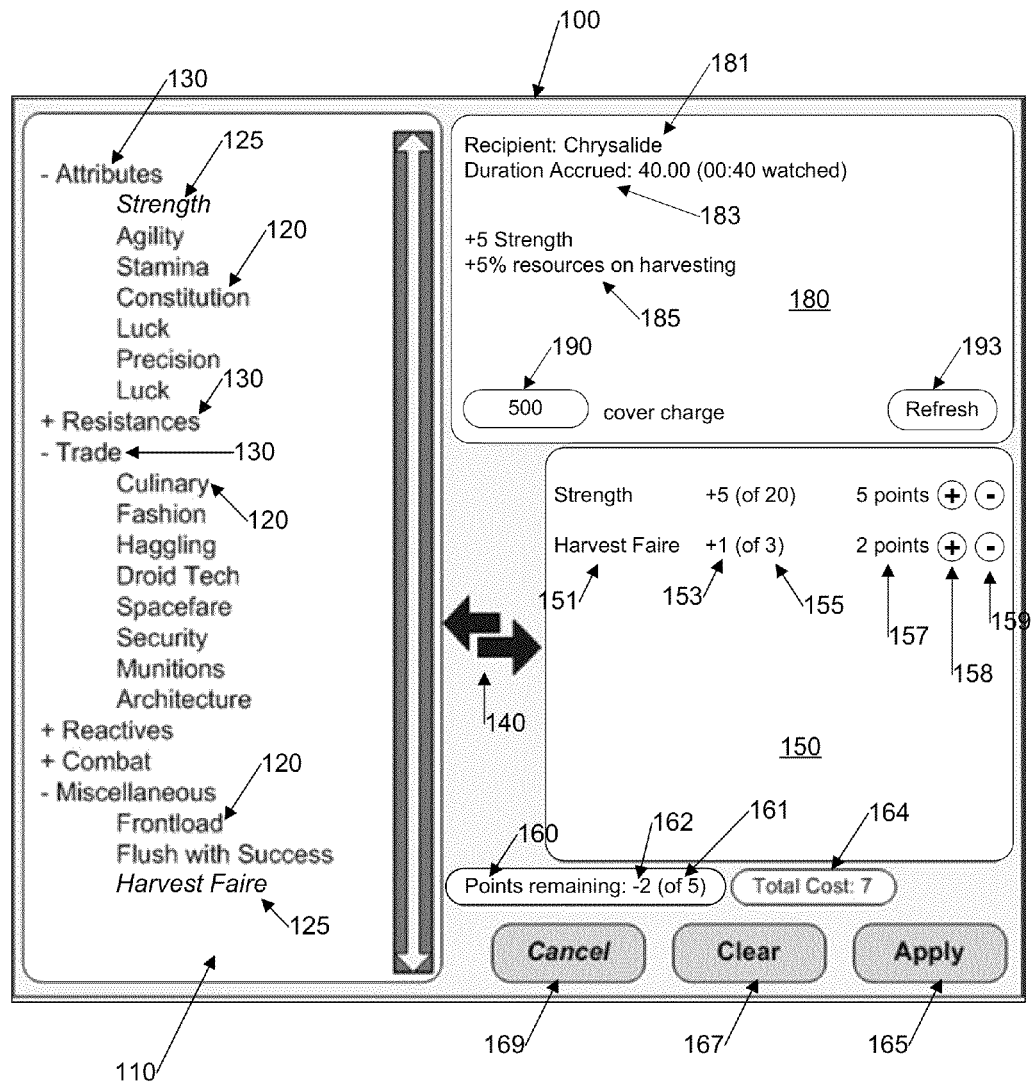
FIG. 1 illustrates a user interface (UI) for an entertainer character in accordance with one implementation of the present invention.

The present invention provides for implementations of a computer game which allow Entertainment Characters (hereinafter referred to as "entertainers") to design an enhancement through a user interface (UI) of the game and causes that enhancement to be applied to a target item or character. For example, one implementation provides a customized enhancement system for entertainers in a massively multi-player online (MMO) game, such as Star Wars Galaxies™ offered by Sony Online Entertainment LLC.

After reading this description it will become apparent how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention.

In one implementation, the entertainers are enabled to: design and perform a performance; design enhancements such as bonuses and/or penalties ("buffs") to be applied to a target item (e.g., object, structure, character); and select performance packages which use a series of trade off choices to determine the final bonuses and/or penalties. In this implementation, the entertainers are allowed to design a customized enhancement, by selecting for example, bonuses, modifications and duration.

In one implementation, the entertainer is allowed to design a customized enhancement and causes the customized enhancement to be applied to a target in the game. For example, an MMO provides enhancements or "buffs" that can be applied to characters, items, or other objects in the game and the MMO also provides entertainers with an interface for building customized buffs. The form of the buff and the application mode can vary depending on the game and environment. Examples include performances, songs, stories, spells, potions, food, fields or auras, chemicals, psychic effects, and so on. In some cases, the enhancement can be applied directly or it can be stored in an item or area to be applied to a target at a later time.

In one specific implementation, the entertainer or performer characters can use a customized enhancement or inspiration system, hereinafter referred to as "Build-a-Buff." Build-a-Buff gives entertainers the ability to provide unique, custom buffs for their customers by allowing entertainers to select from a wide range of modifiers and effects, which are combined to create a single buff tailored to the needs of their patron.

Build-a-Buff is easy to use for both the entertainer and the patron or recipient. In one example, the patron first "watches" or "listens" to the entertainer. If the entertainer wishes to inspire their patron through enhancements, the entertainer uses an "inspire" command with the patron targeted. This will bring up the Build-a-Buff interface. In one implementation, a list of modifiers and effects are displayed, organized by categories. The entertainer can then begin selecting the effects they wish to apply. Most effects can be stacked multiple times for greater benefit. In some embodiments, entertainers have a limited number of "buff points" to spend on creating their buff and the cost of different effects vary.

Turning now to FIG. 1, an entertainer user interface (UI) 100 is designed to allow the entertainers to "craft" a series of bonuses and penalties to bestow on chosen viewers. The entertainer's "performance package" uses a series of trade off choices to determine the final bonuses and negatives that the performance grants the chosen viewers.

To begin the buff creation process, the entertainer targets the player upon which she wishes to apply the buff and activates an "inspiration" command. Activation of the inspiration command displays the buff creation UI 100. The UI 100, as illustrated in FIG. 1, includes a package window 110, a buff window 150, and a summary window 180.

The UI 100 lists the available packages 120 in the package window 110. In the illustrated embodiment of FIG. 1, the entertainer will click on a desired package to select the desired package and press a "move right" arrow button that will move the selected package 125 to a list in the buff window 150. The buff window 150 provides an indication of which packages 125 are going to be modified in the current buff.

In the illustrated implementation of FIG. 1, package window 110 lists the categories 130 and available packages 120 for each category 130 that an entertainer can select for her "inspiration" buff. Each category 130 may be expanded to show all packages 120 available of that type, or collapsed to just show the category.

In the illustrated implementation of FIG. 1, a package 120 can be moused-over to display the relevant statistics of that package 120. For example, relevant statistics may include package name, description of the package, and the point cost per purchase or refund of the package. To select a package 120, the entertainer 'left clicks' and then hits the '< >' arrow (center) 140 to add it to buff window 150. Clicking on the same package and hitting the arrow again will remove it from buff window 150 and restore it to package window 110, In one implementation, each time the '< >' arrow (center) 140 is pressed it refreshes the summary window 180.

In one implementation, a maximum of five packages 120 can be placed in the "being modified" list or buff window 150 at a time. However, in such implementation, the actual limitation might be lower based on the skill and/or expertise of the Entertainer. If desired, packages can be moved from the buff window 150 back to the package window 110.

Once packages 120 have been moved into the buff window 150, points can be spent to increase or decrease a package 120 to create a buff or debuff effect, respectively. In one example, by default, entertainers will start with five net buff points. However, in the example, the starting amount of points may be increased through expertise to a maximum of 15. To acquire additional points to spend on a package 120, points must be decreased from another package 120. For example, if an entertainer has selected two packages 120 to be modified (strength and agility) she must first decrease the strength package in order to increase the agility package if her initial points are already spent.

As used herein, a package is the specific amount of an attribute or effect that is considered the smallest spend/refund amount. A spend/refund affector is the actual amount increased or reduced for the appropriate attributes for a particular package.

It should be appreciated that buff points to not directly translate into the modified value of the package. Instead, each package has a cost associated with it that must be spent (or is refunded when going negative) to increase its value.

In an exemplary implementation, each package has a price (in points), a spend affector (the positive buff aspect), a refund affector (the negative buff aspect), a maximum refund threshold, category, expertise required (if any), and two descriptions representing the positive and negative aspects of the package. Table 1 shows a plurality of packages contemplated by the Build-a-Buff system. Expertise can be purchased to impact specific packages (modifying the affectors) and increase initial point allocation. Expertise for specific packages directly modify the affectors, either in positive or negative amounts.

TABLE 1

Exemplary Buff Packages

| Package | Cost | Spend Affector | Refund Affector | Max Threshold | Exp. Req | Description |
|---|---|---|---|---|---|---|
| Strength | 1 | 1 | −1 | 20 | | 5 to attribute per package |
| Constitution | 1 | 1 | −1 | 20 | | 5 to attribute per package |
| Stamina | 1 | 1 | −1 | 20 | | 5 to attribute per package |
| Precision | 1 | 1 | −1 | 20 | | 5 to attribute per package |
| Agility | 1 | 1 | −1 | 20 | | 5 to attribute per package |
| Luck | 1 | 1 | −1 | 20 | | 5 to attribute per package |
| Kinetic | 2 | 250 | 250 | 10 | | 250 to resistance per package |
| Energy | 2 | 250 | 250 | 10 | | 250 to resistance per package |
| Heat | 2 | 250 | 250 | 10 | | 250 to resistance per package |
| Cold | 2 | 250 | 250 | 10 | | 250 to resistance per package |
| Acid | 2 | 250 | 250 | 10 | | 250 to resistance per package |
| Electricity | 2 | 250 | 250 | 10 | | 250 to resistance per package |
| Frontload | 2 | 5 | −5 | 10 | | 5 min. increase for this specific buff given at the beginning of the performance. Does not increase duration maximum. |

TABLE 1-continued

Exemplary Buff Packages

| Package | Cost | Spend Affector | Refund Affector | Max Threshold | Exp. Req | Description |
|---|---|---|---|---|---|---|
| Culinary | 5 | 2 | 0 | 3 | | 2% increase in Assembly, Experimentation, and 7% Experience for Chef |
| Fashion | 5 | 2 | 0 | 3 | | 2% increase in Assembly, Experimentation, and 7% Experience for Tailor |
| Haggling | 5 | 2 | 0 | 3 | | 2% increase in Assembly, Experimentation, and 7% Experience for Merchant |
| Droid Tech | 5 | 2 | 0 | 3 | | 2% increase in Assembly, Experimentation, and 7% Experience for Droid Engineer |
| Spacefare | 5 | 2 | 0 | 3 | | 2% increase in Assembly, Experimentation, and 7% Experience for Shipwrights |
| Security | 5 | 2 | 0 | 3 | | 2% increase in Assembly, Experimentation, and 7% Experience for Armorsmith |
| Munitions | 5 | 2 | 0 | 3 | | 2% increase in Assembly, Experimentation, and 7% Experience for Weaponsmith |
| Architecture | 5 | 2 | 0 | 3 | | 2% increase in Assembly, Experimentation, and 7% Experience for Architects |
| Reactive: Second Chance | 5 | 5 | 0 | 5 | | 5% per package spent to recover from a killing blow with 10% Health |
| Critical Hit % | 5 | 1 | −1 | 4 | | 1% bonus per package to critical hit chance |
| Dodge % | 5 | 1 | −1 | 4 | | 1% bonus per package to dodge |
| Movement Speed | 3 | 1 | −1 | 7 | | 1% bonus per package to movement speed increase (foot speed and mounts) |
| Health Regen | 3 | 1 | −1 | 7 | | 1% bonus per package to in-combat health regen |
| Action Regen | 3 | 1 | −1 | 7 | | 1% bonus per package to in-combat action regen |
| Action Cost reduction | 5 | 5 | −5 | 3 | | 5% bonus per package in reducing all action costs |
| Healing | 5 | 1 | −1 | 4 | Holism | 1% bonus per package to healing effects that you receive |
| Healer | 5 | 1 | −1 | 4 | Holism | 1% bonus per package to healing effects you cast on others |
| Reactive: Go with the Flow | 5 | 1 | 0 | 5 | Go with the Flow | 5% chance to get a brief 1% per package spent Dodge % increase when hit successfully |
| Harvest Faire | 2 | 5 | 0 | 3 | Harvest Faire | 5% increase per package on the amount and chance on harvests and creature kills |

TABLE 1-continued

Exemplary Buff Packages

| Package | Cost | Spend Affector | Refund Affector | Max Threshold | Exp. Req | Description |
|---|---|---|---|---|---|---|
| Flush with Success | 2 | 5 | 0 | 3 | Flush with Success | 5% increase per package in the amount of credits and loot rolls on kill corpses |

Referring back to the illustrated implementation of FIG. 1, the buff window 150 lists the packages 120 that have been added from the package window 110. These selected packages 125 are what the entertainer uses for purchasing or refunding a package. Each line lists a specific package 151, the current number of times the package has been purchased/refunded (costing points, getting points) 153, the maximum number of purchases/refund available 155 for this package, and the number of points currently being invested or refunded 157. Each line also has a '+' button 158 for increasing the number of purchases (or decreasing the number of refunds, conversely) and a '−' button 159 for increasing the number of refunds (or decreasing the number of purchases, conversely). Each time one of these buttons 158, 159 is pressed, the line's data changes to reflect this. Additionally, in one implementation, each button press also refreshes summary window 180.

In one specific implementation, points 157 are always represented as whole numbers, and cannot be modified by a percentage. Expertise does not impact the point cost 157 of packages 151. It is contemplated that every package 151 costs one or more points. If a refund affector 157 is zero, the package cannot be used as a refund.

In one specific implementation, a threshold is set for all packages as 5/+50%, meaning that for every five times a package 151 is purchased, it becomes 50% more expensive for the next series of five of that package 151. Consequently, the sixth purchase of the package is 150% of the original cost, the eleventh purchase is 200% of the original cost, and so forth.

It is contemplated that the only threshold for refunds (points back) is a maximum of the threshold for that specific package (data in the package). The maximum is thus used both by spends and refunds as a cap. As used herein, the diminishing returns threshold is the point spend/refund multiples that determine the maximum number of times a package can be spent or refunded, and the successive cost in spends. In practice, the diminishing returns should only apply to the up front cost of purchasing additional points in the same package. The refund value should be the amount of points that was placed into that package at the increased cost.

In one implementation, each threshold (e.g., 5 purchases) changes the color of the package 151. For example, the package 151 may start from white and go green, then go to yellow, then go to orange, then go to red. When the package 151 can no longer be refunded or purchased, it may turn from red to black.

Still referring to FIG. 1, summary window 180 shows the potential recipient 181 of the buff, the amount of time spent watching the entertainer (duration accrued) 183, and individual lines 185 of what the packages 151 in the buff window 150 will impact. For example, each line shows the bonuses or negatives accrued from the manipulation of the buff window 150 and the packages 151 within the buff window 150.

Once a buff has been constructed and the data has been set on a recipient, the duration is calculated from any packages/expertise that modify duration and the amount of time that the recipient has been watching an entertainer (e.g., duration accrued 183) in normal performances up to this point. In one specific implementation, the duration accrued 183 may include time spent watching any entertainer.

The longer a player has been watching an entertainer previous to the buff application, the longer the duration of the buff. In a specific implementation, buff duration is increased in ten minute increments up to a maximum of about three hours (with expertise). The actual (modified) duration of the buff is displayed in the summary windows 180, 210 so that the entertainer and the recipient know exactly how long the applied buff will last.

In the illustrated implementation of FIG. 1, summary window 180 also includes a cover charge input 190 and a refresh button 193. The cover charge input 190 allows the entertainer to specify the price that will be charged to the recipient upon receiving this buff. Changing the value and pressing enter or hitting the refresh button 193 will update the summary window 180 for and the recipient UI (shown in FIG. 2). The refresh button 193 is used to manually and explicitly calculate/update the summary window 180 and relay the cover charge information to the recipient UI. In one implementation, this also happens automatically, as mentioned above, every time specific elements in the UI are used (e.g., when buttons 158, 159 are pressed).

Additionally, in a specific implementation, the summary window 180 includes all modifiers from expertise or to other sources, not just base data. For example, every refresh of the summary window 180 may run the currently configured buff through the buff code to determine the actual effects of the configured packages.

The UI 110 may also include an indicator 160 of how many points are available or remaining to spend on buffs, a total cost indicator 164, an apply button 165, a clear button 167, and a cancel button 169. In the implementation shown in FIG. 1, the points remaining indicator 160 is located below the buff window 150. The points remaining indicator 160 shows the number of points that the entertainer has from the base amount and any refunds in the buff window 150. For example, the points remaining indicator 160 shows the maximum points available (in parentheses) 161 and the current points used 162. In one specific implementation, during construction of a buff, an entertainer can go into negative points but cannot apply or commit the buff until points are zero or positive.

The total cost indicator 164 shows the total point cost for the current buff. The cancel button 169 exits out of the UI 100 (and closes the recipient UI) without applying the buff or assessing the cover charge. The clear button 167 clears the buff window 150 completely.

The apply button 165 is used to commit to the buff currently selected in the buff window 150. When the entertainer is satisfied with the buff, she may click on the apply button 165, which will save the buff data on the target player and complete the process.

In one specific implementation, the apply button 165 is grayed-out unless the Entertainer is at zero or positive points in the points remaining indicator 160. A confirmation may appear once apply button 165 is selected, with a message for zero (e.g., "Are you sure you want to apply this buff?") or a message for 1+ (e.g., "You still have points to spend, apply anyway?").

Figure 2:
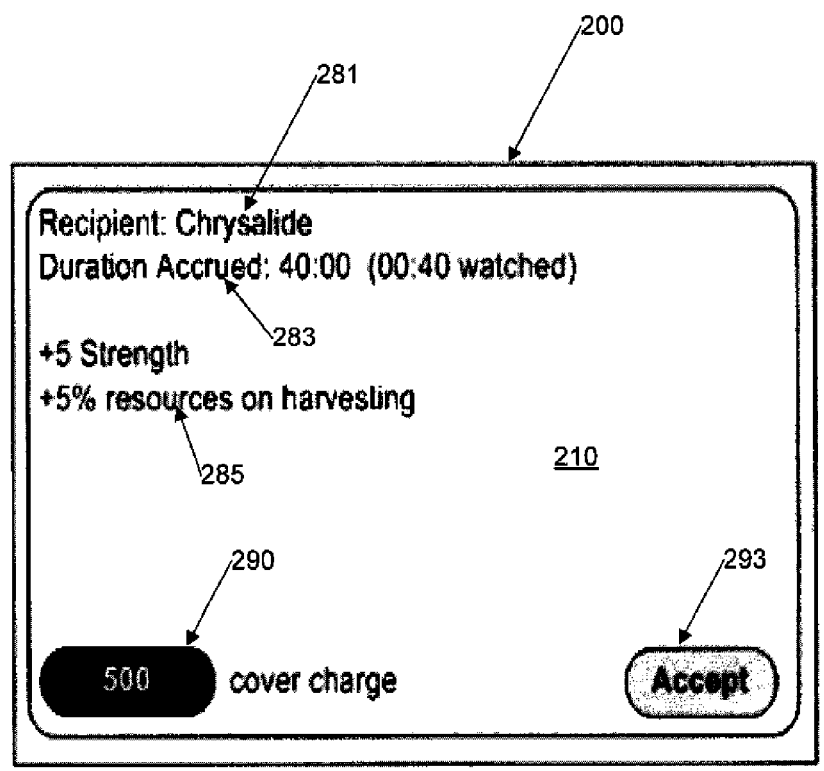
FIG. 2 illustrates a user interface (UI) for a recipient character in accordance with one implementation of the present invention.

Turning now to FIG. 2, a recipient user interface (UI) 200 is designed to show the recipient or target character of the buff the particular details of the buff. In one implementation, UI 200 includes a summary window 210 which provides similar information to the recipient as summary window 180 provides to the entertainer. For example, as shown in the implementation of FIG. 2, the information contained in summary window 210 is the same as the information in summary window 180, except that the cover charge price 290 cannot be changed. Thus, as shown, summary window 210 shows the potential recipient 281 of the buff, the amount of time spent watching the entertainer (duration accrued) 283, individual lines of what the packages 151 in the buff window 150 will impact 285, and an accept button 293. As shown, the summary window 210 is refreshed during the same events as the summary window 180.

In one specific implementation, before the commitment is made to the current buff, the recipient has to click the accept button 293 in the recipient UI 200 and the cover charge must be successfully deducted from the recipient. For example, the accept button 293 is grayed-out until the entertainer clicks the apply button 165 in the entertainer UI 100. Once the entertainer clicks the apply button 165, the recipient can click the accept button 293 to conclude the transaction and receive the buff.

The Build-a-Buff system, as illustrated by FIGS. 1 and 2, allows for automatic and secure transfer of payment for services rendered between the entertainer and the recipient.

In one specific implementation, the entertainer may enter a credit cost for the service in the summary window 180. When the entertainer is finished, the apply button 165 is pressed. In the summary window 210, the recipient sees the listing of the effects that will be applied and the credit cost. If the recipient finds the offer agreeable, the recipient may also hit the accept button 293. The buff is applied with the listed effects and credits automatically and securely are transferred to the entertainer.

It is contemplated that the Build-a-Buff Inspiration System is available to all entertainers. For those who wish to specialize in inspiration, expertise points can be spent to increase the number of "buff points" to spend to allow more modifiers and effects to be applied. In addition, expertise are also available for purchase that will allow the entertainer access to special packages that allow different and more powerful effects to be added to their custom buffs.

A wide range of effects means that entertainers can offer something to everyone regardless of class or level. This easy to use, robust system will give entertainers exciting and lucrative ways to please their customers.

Figure 3:
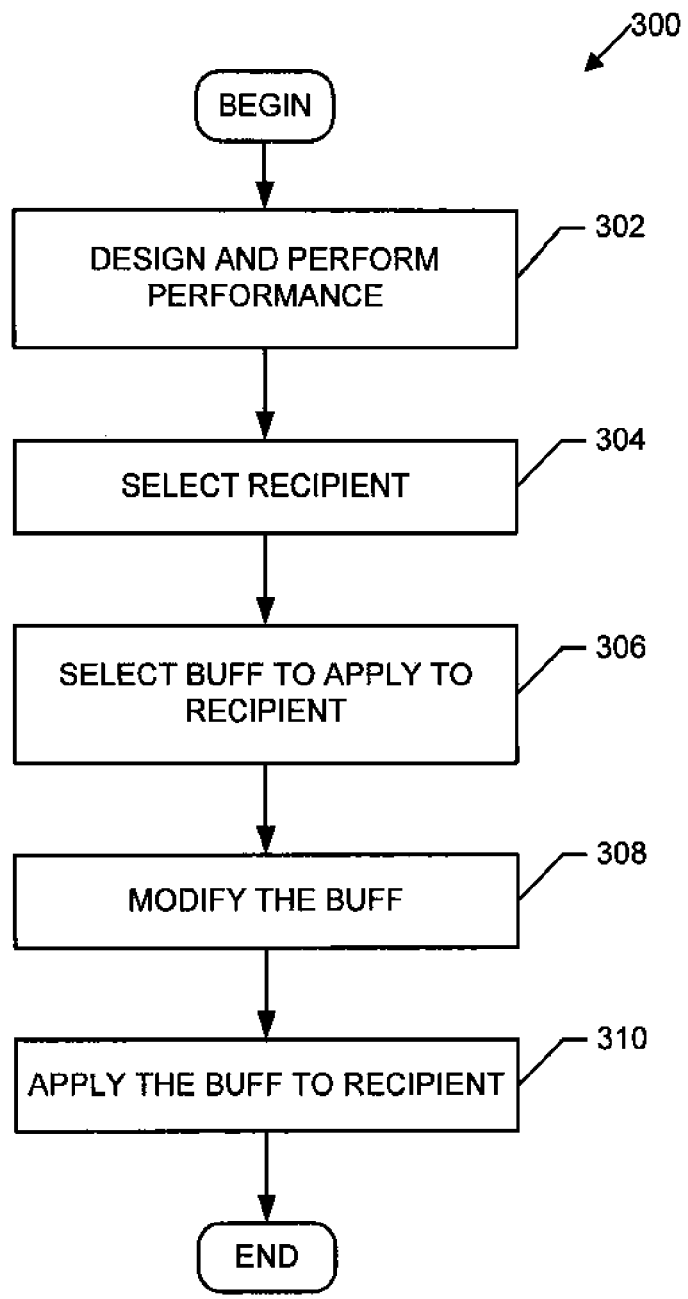
FIG. 3 shows a flowchart implementing a computer game that allows the entertainer character to craft a series of bonuses and penalties to bestow on chosen recipient characters according to one implementation of the present invention.

FIG. 3 shows a flowchart 300 implementing a computer game that allows the entertainers to inspire their patrons or recipients through customized enhancements according to one implementation of the present invention. The computer game includes designing and performing a performance, at box 302. At box 304, the recipient or target character is selected.

The computer game also includes selecting a buff to apply to the recipient, at box 306. In one implementation, the entertainer is allowed to manipulate or modify the is buff, at box 308. For example, buffs for packages 120 within each category 130 can be varied and are designed to be effective for a fixed duration of time proportional to the duration of time spent by the recipient experiencing the performance. When the buff is complete, the entertainer then applies the buff to the recipient, at box 310.

In the computer game, the buff creation and application is controlled using a user interface designed to allow the entertainer to select and modify buff packages provided by the computer game. The resulting buff or "performance package" uses a series of trade off choices to determine the final bonuses and negatives that the performance grants the desired recipients.

Figure 4A:
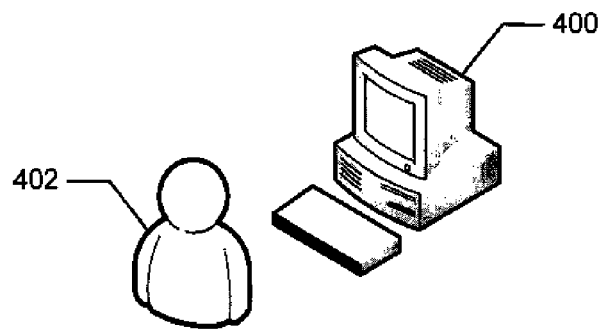
FIG. 4A illustrates a representation of a computer system and a user.

FIG. 4A illustrates a representation of a computer system 400 and a user 402. The user uses the computer system 400 to perform buff creation. The computer system 400 stores and executes a buff creation system 490, such as a system 100, 200.

Figure 4B:
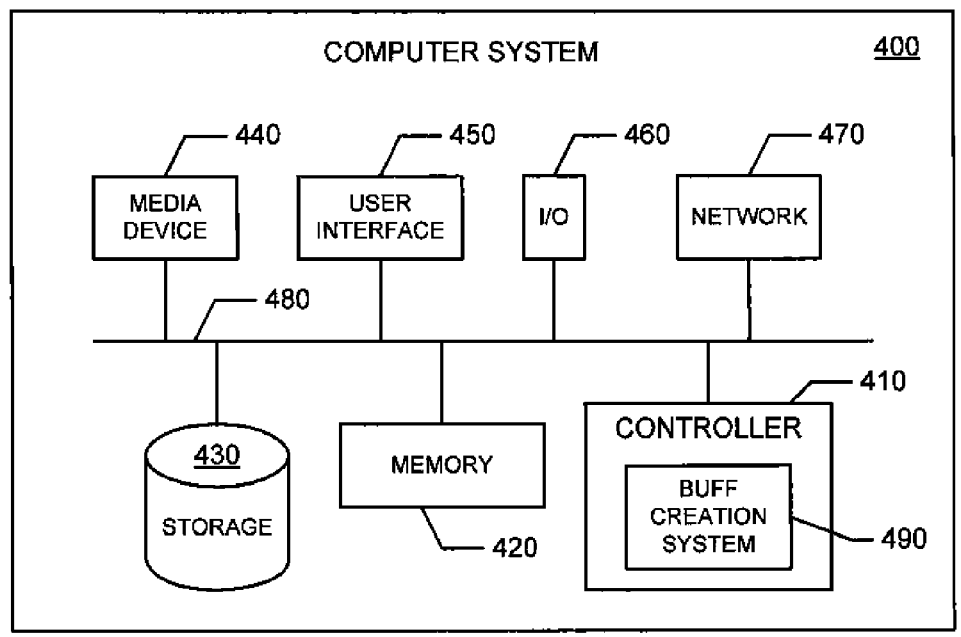
FIG. 4B is a functional block diagram illustrating the computer system hosting an incubation system.

FIG. 4B is a functional block diagram illustrating the computer system 400 hosting the buff creation system 490. The controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the buff creation system 490 as a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data temporarily or long term for use by other components of the computer system 400, such as for storing data used by the buff creation system 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user. In one implementation, the user interface 450 includes a keyboard, a mouse, audio speakers, and a display. The controller 410 uses input from the user to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer Is system can be used (e.g., different bus or storage configurations or a multi-processor configuration).

In one specific implementation, the buff creation system 490 includes one or more programmable processors and corresponding computer system components to store and execute computer instructions, such as to provide the server and client computer systems providing the enhancement system in an online game environment, such as an MMC. In another implementation, the enhancement system is provided within a single computer or game system, such as in a game console system, and does not require access to a network for play.

The above-described technology is applicable in various types of game settings such as science fiction, fantasy or superhero games. Additional variations and implementations are also possible. For example, while the discussion above focuses on customized enhancements, other modifications could also be made available, such as negative modifiers to attributes or statistics ("debuffs") or effects that do not change attributes but affect gameplay or appearance. These effects could be combined with positive effects, such as to offset a total cost of the modification. In one example, a player designs a poison item with a specific negative effect on an attribute of any character that is affected by the poison (e.g., by combat or ingestion). In another example, a player designs a song that causes an effect on the environment, such as causing listeners to dance a specific dance, nearby birds to sing, or to change the color of clothing for a period of time. In another implementation, the customized enhancements can be stored as plans or blueprints and used multiple times or taught or sold to other characters. In yet another implementation, the enhancement system is not used for a game, but for some other online environment, such as an online social environment or virtual world.

Various implementations are or can be implemented primarily in hardware using, for example, components such as application specific integrated circuits ("ASICs"), or field programmable gate arrays ("FPGAs"). Implementations of a hardware state machine capable of performing the functions described herein will also be apparent to those skilled in the relevant art. Various implementations may also be implemented using a combination of both hardware and software.

Furthermore, those of skill in the art will appreciate that the various illustrative logical blocks, modules, connectors, data paths, circuits, and method steps described in connection with the above described figures and the implementations disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, connectors, data paths, circuits, and method steps described in connection with the implementations disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or technique described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. A storage medium can be coupled to the processor such that the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent a presently preferred implementation of the invention and are therefore representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

What is claimed is:

1. A computer-implemented method of creating enhancements in a computer game for a recipient experiencing a performance designed and performed by an entertainer, the method comprising:
   performing the performance by the entertainer;
   selecting an enhancement to apply to the recipient;
   modifying the enhancement; and
   applying the modified enhancement to the recipient for experiencing the performance including viewing and participating in the performance,
   wherein the modified enhancement is effective for a fixed duration of time proportional to the time spent by the recipient experiencing the performance.

2. The method of claim 1, further comprising
   selecting a recipient to receive the enhancement prior to selecting the enhancement.

3. The method of claim 1, wherein selecting an enhancement comprises
   selecting an available buff package from a list of buff packages.

4. The method of claim 3, wherein the list of buff packages include buff packages selected from the group including strength, constitution, stamina, precision, agility, luck, kinetic, energy, heat, cold, acid, electricity, frontload, culinary, fashion, haggling, droid tech, spacefare, security, munitions, architecture, reactive: second chance, critical hit percentage, dodge percentage, movement speed, health regen, action regen, action cost reduction, healing, healer, reactive: go with the flow, harvest faire, and flush with success.

5. The method of claim 3, wherein selecting an enhancement further comprises
moving the available buff package into a list of being-modified buff packages.

6. The method of claim 3, wherein the available buff package includes information associated with the available buff package.

7. The method of claim 6, wherein the information associated with the available buff package includes package name, description of the package, and the point cost of the package.

8. The method of claim 3, wherein the available buff package includes a package price, a spend affector, a refund affector, a maximum refund threshold, and a buff category.

9. The method of claim 1, wherein applying the modified enhancement comprises applying buffs for viewing the performance.

10. The method of claim 3, wherein modifying the enhancement comprises
spending buff points to increase or decrease properties of the available buff package.

11. The method of claim 10, wherein applying the modified enhancement is allowed when the number of the buff points available is at least zero.

12. The method of claim 3, wherein modifying the enhancement comprises modifying a plurality of available buff packages.

13. The method of claim 1, further comprising
providing the recipient information about the modified enhancement prior to the modified enhancement being applied to the recipient.

14. The method of claim 1, wherein the recipient agrees to accept the modified enhancement prior to the modified enhancement being applied to the recipient.

15. A non-transitory computer-readable storage medium storing a computer program for creating at least one custom enhancement for a recipient experiencing a performance designed and performed by an entertainer, the program comprising executable instructions that cause a computer to:
perform the performance by the entertainer;
select the at least one custom enhancement to apply to the recipient; and
apply the at least one custom enhancement to the recipient for experiencing the performance including viewing and participating in the performance,
wherein the at least one custom enhancement is effective for a fixed duration of time proportional to the time spent by the recipient experiencing the performance.

16. The non-transitory computer-readable storage medium of claim 15, wherein the executable instructions further cause the computer to
modify the at least one custom enhancement.

17. The non-transitory computer-readable storage medium of claim 16, wherein the program comprising executable instructions that cause a computer to modify the at least one custom enhancement comprises executable instructions that cause the computer to
spend buff points to increase or decrease properties of an available buff package.

18. The non-transitory computer-readable storage medium of claim 15, wherein the program comprising executable instructions that cause a computer to apply the at least one custom enhancement to the recipient comprises executable instructions that cause the computer to
transfer the at least one custom enhancement to the recipient if the number of buff points available is at least zero.

19. The non-transitory computer-readable storage medium of claim 15, wherein the program comprising executable instructions that cause a computer to apply the at least one custom enhancement to the recipient comprises executable instructions that cause the computer to
receive permission from the recipient accepting the at least one custom enhancement prior to the at least one custom enhancement being applied to the recipient.

20. The non-transitory computer-readable storage medium of claim 15, wherein the at least one custom enhancements comprises buffs for viewing an entertainer's performance.

21. The non-transitory computer-readable storage medium of claim 20, wherein the buffs comprise performances, songs, stories, spells, potions, food, fields or auras, chemicals or psychic effects.

22. The non-transitory computer-readable storage medium of claim 15, wherein at the at least one custom enhancement may be stacked for greater benefit.

* * * * *